(12) United States Patent
Yi et al.

(10) Patent No.: US 8,370,624 B2
(45) Date of Patent: Feb. 5, 2013

(54) KEY GENERATION METHOD FOR SELF-CONFIGURATION

(75) Inventors: Jeong-hyun Yi, Yongin-si (KR); Tae-chul Jung, Yongin-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 744 days.

(21) Appl. No.: 11/716,696

(22) Filed: Mar. 12, 2007

(65) Prior Publication Data

US 2008/0072038 A1    Mar. 20, 2008

(30) Foreign Application Priority Data

Sep. 20, 2006 (KR) ........................ 10-2006-0090992

(51) Int. Cl.
*H04L 29/06* (2006.01)
(52) U.S. Cl. ........................ 713/156; 380/277
(58) Field of Classification Search .................. 380/277
See application file for complete search history.

(56) References Cited

U.S. PATENT DOCUMENTS

| | | | | |
|---|---|---|---|---|
| 6,480,473 | B1 * | 11/2002 | Chambers et al. | 370/253 |
| 7,594,275 | B2 * | 9/2009 | Zhu et al. | 726/26 |
| 2006/0023887 | A1 * | 2/2006 | Agrawal et al. | 380/277 |

OTHER PUBLICATIONS

Luo et al., "URSA: Ubiquitous and Robust Access control for Mobile Ad Hoc Networks", IEEE, Dec. 2004.*
Kong et al., "Providing Robust and Ubiquitous Security Support for Mobile Ad-Hoc Networks", IEEE, Nov. 2001.*
Narasimha et al., "On the Utility of Distributed Cryptography in P2P and MANETs: the Case of Membership Control", IEEE, Nov. 2003.*
Zhu et al., "Efficient and robust Key management for large mobile ad oc networks", Computer Networks, vol. 48 (2005), pp. 657-682.*
Saxena et al., "Efficient Node Admission for Short-lived Mobile Ad Hoc Networks", Network Protocols, 2005. ICNP 2005. 13th IEEE International Conference, 10 pages pp. 278.*
Narasimha et al., "On he Utility of Distributed Cryptography in P2P and MANETs: the Case of Membership Control", http://www.ics.uci.edu/~gts/paps/nty03.pdf, Nov. 2003. 10 pages.*
Hailong et al., "Authenticated Group Key Agreement with Admission Control", 2004, Proceeding InfoSecu '04 Proceedings of the 3rd international conference on Information Security, ACM ISBN:1-58113-955-1.*
Herzog, "The Diffie-Hellman Key-Agreement Scheme in the Strand-Space Model", 2003, http://www.dtic.mil/cgi-bin/GetTRDoc?ADADA460268.*
J. Kong et al., "Providing Robust and Ubiquitous Security Support for Mobile Ad-Hoc Network," Proceedings of the IEEE 9th International Conference on Network Protocols (ICNP'01), 10 pages, 2001.*

* cited by examiner

*Primary Examiner* — Jeffrey Pwu
*Assistant Examiner* — Hee Song
(74) *Attorney, Agent, or Firm* — NSIP Law

(57) ABSTRACT

A key generation method for self-configuration is provided which includes selecting existing nodes as many as a predefined reference number t from nodes which configure a network; transmitting a partial key request message to the selected existing nodes; and generating a node key based on randomized partial keys received in response to the partial key request. Accordingly, when a new node intends to join the network, the existing nodes forming the network can allocate a node key to the new node by themselves. Also, whether the node key of the new node is compromised or not can be verified using the error-checking witness.

23 Claims, 2 Drawing Sheets

KEY GENERATION METHOD FOR SELF-CONFIGURATION

CROSS-REFERENCE TO RELATED APPLICATIONS

This application claims the benefit under 35 U.S.C. §119(a) of Korean Patent Application No. 2006-0090992 filed on Sep. 20, 2006, in the Korean Intellectual Property Office, the entire disclosure of which is hereby incorporated by reference.

BACKGROUND OF THE INVENTION

1. Field of the Invention

The present invention relates to a key generation method for self-configuration. More particularly, the present invention relates to a key generation method which enables terminal nodes establishing a network to let a new node join the network by themselves and to allocate a key to the new node without a centralized key management and distribution server.

2. Description of the Related Art

In general, key generation and management methods include centralized key generation methods and distributed group key generation methods.

FIG. 1 depicts a centralized key generation method. Referring to FIG. 1, according to a centralized key generation method, a key distribution server allocates private keys to a plurality of nodes forming a network. Disadvantageously, errors occurring at the key distribution server affect the entire network and it is difficult to apply the centralized key generation method to a self-organized network where a node forming the network arbitrarily and repeatedly joins or leaves the network. Types of self-configuration networks include ad-hoc networks and mesh networks.

FIG. 2 depicts a distributed group key generation method. Referring to FIG. 2, according to a distributed group key generation method, when a new node joins a network, group keys of both the new node and the existing nodes forming the network need to be updated at the same time. Since all of the nodes establishing the network need to update their keys at the same time, the computational complexity becomes too high and it is hard to apply the distributed group key generation method to a self-organized network.

SUMMARY OF THE INVENTION

Exemplary embodiments of the present invention address at least the above problems and/or disadvantages and provide at least the advantages described below. Accordingly, an exemplary aspect of the present invention is to provide a key generation method which enables key allocation in a network having no key distribution server to a new node joining the network without key changes of existing nodes.

According to an exemplary aspect of the present invention, there exists a key generation method which includes selecting existing nodes as many as a predefined reference number t from nodes which configure a network; transmitting a partial key request message to the selected existing nodes; and generating a node key based on randomized partial keys received in response to the partial key request.

The node key may be generated by summing all of the randomized partial keys as many as the reference number.

The key generation method may further include verifying whether the node key is correct.

The verifying operation may determine that the node key is correct when a product of values acquired by raising t error-checking witnesses generated at the network initialization to the power of a new node ID is equal to a value acquired by raising a generator generated at initialization to the power of a node key of the new node, and the verifying operation may determine that the node key is incorrect when the two values are not equal to each other.

The node key may be generated based on a Shamir's secret sharing algorithm.

The selecting operation may receive response messages in reply to a join request, and select the existing nodes as many as the predefined reference number t from the nodes which transmit the response messages.

A recording medium is readable by a computer which stores a program for executing selecting existing nodes as many as a predefined reference number t from nodes which configure a network; transmitting a partial key request message to the selected existing nodes; and generating a node key based on randomized partial keys received in response to the partial key request.

According to another aspect of the present invention, a partial key generation method includes generating, when receiving a partial key request message, a partial key of a node which transmits the partial key request message; randomizing the generated partial key; and transmitting the randomized partial key to the node which transmits the partial key request message.

The generating operation may include receiving an ID $ID_{n+1}$ of the node which transmits the partial key request message, and IDs $ID_k$ of nodes, excluding itself, selected by the node transmitting the partial key request message, and the generating operation calculates a Lagrangian coefficient of the node transmitting the partial key request message using the ID $ID_{n+1}$ of the node transmitting the partial key request message, the IDs $ID_k$ of the nodes, and its ID $ID_j$, and generates the partial key by multiplying the calculated Lagrangian coefficient by its node key $K_j$.

The randomizing operation may include generating a random number $r_j$ and transmitting the generated random number $r_j$ to the nodes, excluding itself, selected by the node transmitting the partial key request message; receiving random numbers $r_k$ from the nodes; generating a shuffled random number $R_j$ using: the IDs $ID_k$ of the nodes received in the generating operation, the random numbers $r_k$ received in the receiving operation, the random number $r_j$ generated in the transmitting operation, and the ID $ID_j$; and randomizing the partial key by summing the shuffled random number and the partial key.

The partial key may be generated based on a Shamir's secret sharing algorithm.

A recording medium is readable by a computer which stores a program for executing generating, when receiving a partial key request message, a partial key of a node which transmits the partial key request message; randomizing the generated partial key, and transmitting the randomized partial key to the node which transmits the partial key request message.

Other aspects, advantages, and salient features of the invention will become apparent to those skilled in the art from the following detailed description, which, taken in conjunction with the annexed drawings, discloses exemplary embodiments of the invention.

BRIEF DESCRIPTION OF THE DRAWING FIGURES

The above and other aspects, advantages, and features of certain exemplary embodiments of the present invention will be more apparent from the following detailed description, taken in conjunction with the accompanying drawings, in which.

Throughout the drawings, the same drawing reference numerals will be understood to refer to the same elements, features and structures.

DETAILED DESCRIPTION OF EXEMPLARY EMBODIMENTS

The matters defined in the description such as a detailed construction and elements are provided to assist in a comprehensive understanding of the embodiments of the invention and are merely exemplary. Accordingly, those of ordinary skill in the art will recognize that various changes and modifications of the embodiments described herein can be made without departing from the scope and spirit of the invention. Also, descriptions of well-known functions and constructions are omitted for clarity and conciseness.

A key management method according to an exemplary embodiment of the present invention utilizes a Shamir's secret sharing algorithm when generating node keys of nodes establishing a network.

Figure 1:
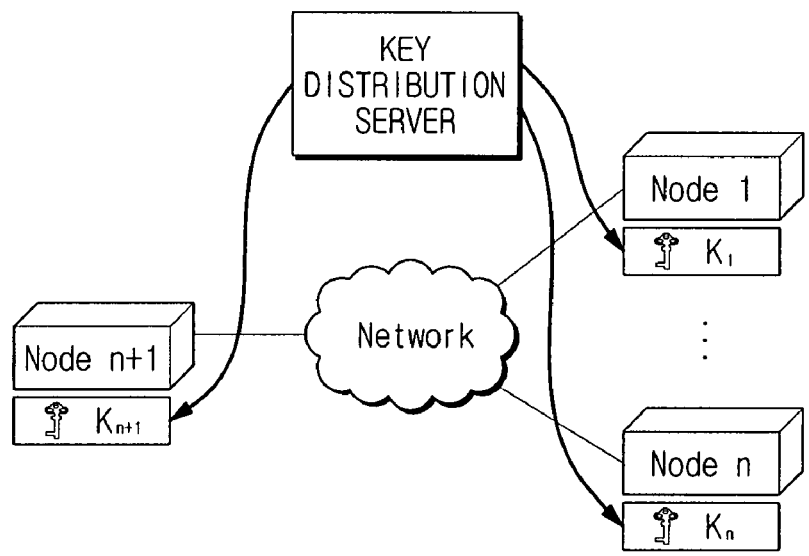
FIG. 1 depicts a centralized key generation method.
Figure 2:
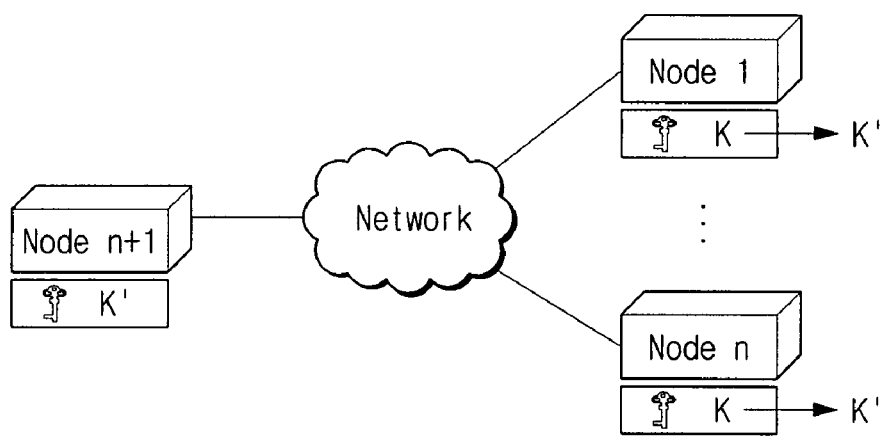
FIG. 2 depicts a distributed group key generation method.
Figure 3:
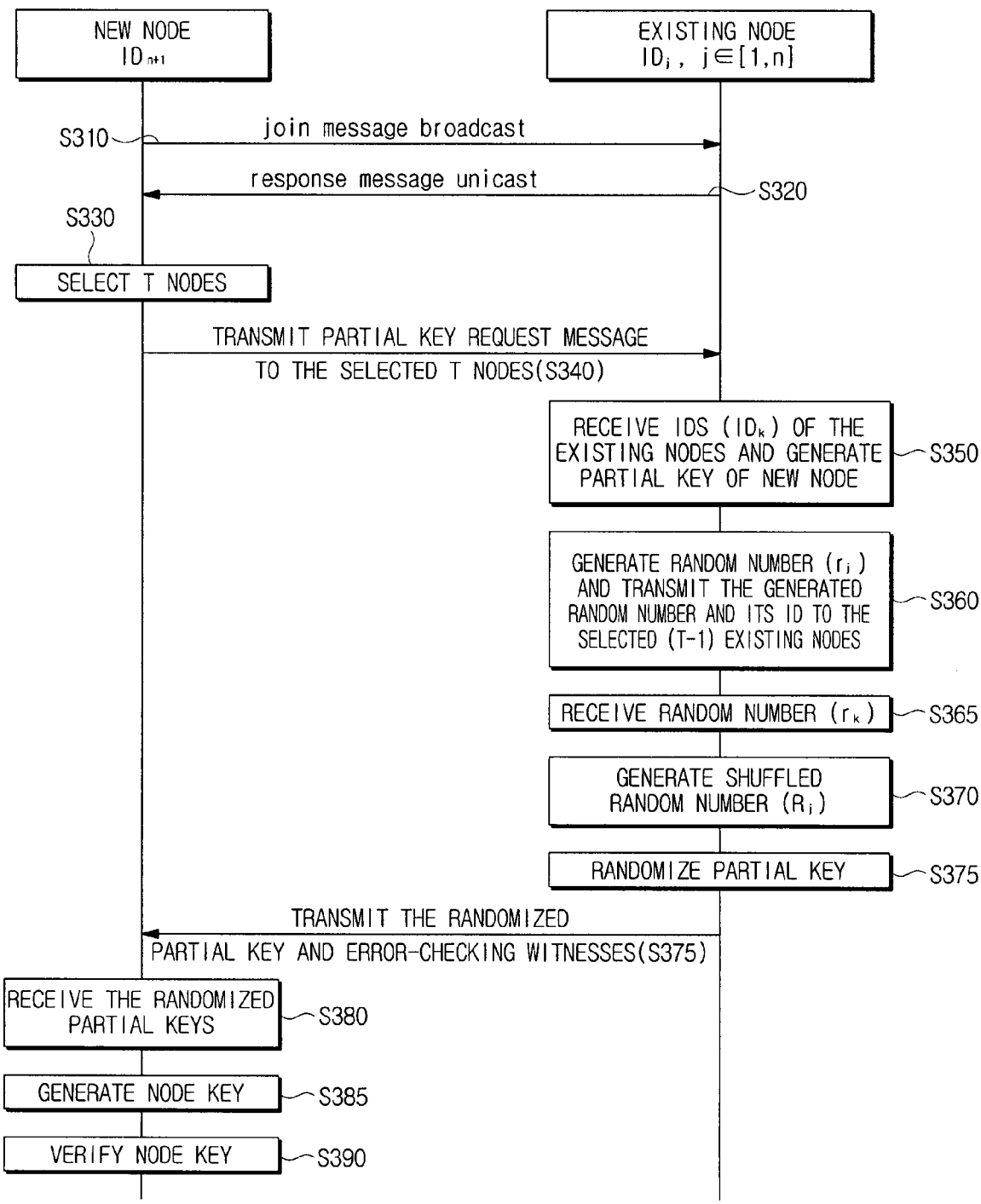
FIG. 3 is a flowchart outlining a key generation method according to an exemplary embodiment of the present invention.

FIG. 3 is a flowchart outlining a key generation method according to an exemplary embodiment of the present invention.

Referring to FIG. 3, a new node N+1 which wants to join a network, broadcasts a join request message, over the network at operation S310. The request message broadcast by the new node N+1 contains the new node's identification (ID) $ID_{n+1}$. The ID includes an e-mail address, a unique number of a mobile device, an IP address, a MAC address, a public key certificate, or the like.

Next, existing nodes forming the network unicasts a response message to the new node in response to the received request message at operation S320. The response message contains ID of the existing node $ID_j$ (j=[1,n]). The existing nodes determine whether to allow the new node to join the network after verifying the new node's ID. The decision-making method of whether the existing nodes admit new node to join depends on an underlying security policy. Since such security policies are well known to one skilled in the art, their further explanation shall be omitted for brevity.

The new node, upon receiving the response messages, selects the existing nodes as many as a predefined reference number t from the nodes that transmitted the response messages S330. At this time, the new node can select the existing nodes as many as the reference number depending on the order of receiving the response messages, or via a predefined selecting method based on an underlying security policy.

Next, the new node transmits a partial key request message to the selected existing nodes at operation S340.

The existing nodes receiving the partial key request message, receive IDs $ID_k$ from (t−1) existing nodes and generate a partial key, which is to be used for the node key generation of the new node, using the received IDs of the existing nodes and the new node's ID at operation S350. In more detail, the existing node transmits its ID $ID_j$ to the (t−1) existing nodes, excluding itself, among the t existing nodes selected by the new node and receives IDs $ID_k$ from the (t−1) existing nodes.

More specifically, the t existing nodes selected at operation S330 generate the partial keys of the new node based on Equation 1.

$$K_{n+1}^j = K_j \lambda_j(ID_{n+1})(\bmod q) \quad \text{[Equation 1]}$$

$$\lambda_j(ID_{n+1}) = \prod_{j=1, j\neq k}^{t} \frac{ID_{n+1} - ID_j}{ID_k - ID_j}$$

In Equation 1, j denotes the t existing nodes selected by the new node from the n existing nodes, k denotes the (t−1) existing nodes, excluding itself, of the selected t existing nodes, $K_j$ denotes the node key of the selected existing node, $\lambda_j(ID_{n+1})$ denotes a Lagrangian coefficient, $K_{n+1}^j$ denotes the new node's partial key generated at the existing node j, and q denotes a large prime number.

The selected t existing nodes calculate the Lagrangian coefficient $\lambda_j(ID_{n+1})$ of the new node using the new node's $ID_{n+1}$ contained in the messages transmitted and received at steps S310 and S320, the IDs $ID_k$ of the (t−1) existing nodes, and their $ID_j$, and calculates the new node's partial key $K_{n+1}^j$ by multiplying the acquired Lagrangian coefficient and the node key $K_j$ of the selected existing nodes. In so doing, the node key $K_j$ of the existing node is pre-configured at the network initialization.

Next, the existing node, upon generating the partial key, generates a random number $r_j$ to protect the generated partial key and transmits the generated random number $r_j$ to the (t−1) existing nodes selected by the new node at operation S360. That is, the existing node transmits the random number $r_j$ to the (t−1) existing nodes, excluding itself, of the existing nodes selected by the new node.

The existing node receives a random number $r_k$ from the (t−1) existing nodes at operation S365.

Next, based on Equation 2, the existing node generates a shuffled random number $R_j$ using the IDs $ID_k$ of the existing nodes and the random number $r_k$ from the (t−1) existing nodes and its generated random number $r_j$ and $ID_j$ at operation S370.

$$R_j = \sum_{k=1, k\neq j}^{t} \text{sign}(ID_j - ID_k)(r_j + r_k) \bmod q \quad \text{[Equation 2]}$$

$$\text{where} \begin{cases} \text{sign}(x) = 1 & \text{if } x > 0 \\ \text{sign}(x) = -1 & \text{if } x < 0 \end{cases}$$

In Equation 2, $R_j$ denotes the shuffled random number, $ID_j$ denotes the ID of the node generating the partial key, $r_j$ denotes the random number, $ID_k$ denotes the ID of the (t−1) existing nodes, and $r_k$ denotes the random number received from the (t−1) existing nodes.

Next, the existing node randomizes the partial key $K_{n+1}^j$ generated using the generated shuffled random number and transmits the randomized partial key $\tilde{K}_{n+1}^j$ and an error-checking witness to the new node at operation S375.

Specifically, the existing node randomizes the partial key by summing the partial key $K_{n+1}^j$ generated at operation S350 and the shuffled random number $R_j$, and transmits the randomized partial key $\tilde{K}_{n+1}^j = K_{n+1}^j + R_j$ and the error-checking witness to the new node. Herein, since the error-checking witness is public information, when the new node already holds the error-checking witness, the existing node may not transmit the error-checking witness to the new node.

Next, the new node receives the randomized partial keys from the t existing nodes at operation S380. That is, the new node receives the random partial key from each of the t existing nodes to which the partial key request message was transmitted at operation S340.

The new node generates its node key by summing the received randomized partial keys at operation S385. The node key of the new node is generated as in Equation 3.

$$K_{n+1} = \sum_{j=1}^{t} \tilde{K}_{n+1}^{j} (\bmod q) \quad \text{[Equation 3]}$$

In Equation 3, $K_{n+1}$ denotes the node key of the new node and $\tilde{K}_{n+1}^{j}$ denotes the randomized partial key received from the t existing nodes.

Next, the new node verifies whether its node key is correct using the error-checking witness $W_i$ and its ID $ID_{n+1}$ at operation S390.

More specifically, the new node selects t error-checking witnesses from a plurality of error-checking witnesses generated at the network initialization. Based on Equation 4, the new node determines its node key is correct when a product of values acquired by raising the t error-checking witnesses to the power of the new node ID $W_i^{(ID_{n+1})^i}$ is equal to a value acquired by raising a generator generated at the initialization to the power of the node key of the new node $g^{K_{n+1}}$. Otherwise, the new node determines its node key is incorrect.

$$g^{K_{n+1}} = \prod_{i=0}^{t-1} W_i^{(ID_{n+1})^i} (\bmod p) \quad \text{[Equation 4]}$$

Meanwhile, in the key generation method according to an exemplary embodiment of the present invention, the new node is able to determine whether the randomized partial key $\tilde{K}_{n+1}^{j}$ received from the t existing nodes is compromised by means of the error-checking witness. In so doing, when the received partial key turns out compromised one, the new node resumes the steps S310 through S390. That is, the new node rebroadcasts a join request message to the network and reselects t existing nodes from the existing nodes that transmit the response messages.

In light of the foregoing, when a new node intends to join the network, the existing nodes forming the network can allocate a node key to the new node by themselves.

Also, whether the node key of the new node is compromised or not can be verified using the error-checking witness.

While certain exemplary embodiments of the invention have been shown and described with reference to certain preferred embodiments thereof, it will be understood by those skilled in the art that various changes in form and details may be made therein without departing from the spirit and scope of the invention as defined by the appended claims and their equivalents.

What is claimed is:

1. A key generation method, comprising:
    selecting existing nodes as many as a predefined reference number t from nodes which configure a network;
    transmitting a partial key request message to the selected existing nodes; and
    generating a node key based on randomized partial keys received in response to the partial key request, wherein:
    the randomized partial keys are randomized by the existing nodes using shuffled random numbers,
    each shuffled random number, Rj, is generated based on the equation:

$$R_j = \sum_{k=1, k \neq j}^{t} \text{sign}(ID_j - ID_k)(r_j + r_k) \bmod q$$

$$\text{where} \begin{cases} \text{sign}(x) = 1 & \text{if } x > 0 \\ \text{sign}(x) = -1 & \text{if } x < 0, \end{cases}$$

and
$ID_j$ denotes the identification of the node generating the partial key, $r_j$ denotes the random number of the node generating the partial key, $ID_k$ denotes the identification of the $k^{th}$ existing node, and $r_k$ denotes the random number of the $k^{th}$ existing node.

2. The key generation method of claim 1, wherein the node key is generated by summing all of the randomized partial keys as many as the reference number.

3. The key generation method of claim 1, further comprising verifying whether the node key is correct.

4. The key generation method of claim 3, wherein:
    the verifying operation determines that the node key is correct when a product of values acquired by raising t error-checking witnesses generated at the network initialization to the power of a new node ID is equal to a value acquired by raising a generator generated at initialization to the power of a node key of the new node; and
    the verifying operation determines that the node key is incorrect when the two values are not equal to each other.

5. The key generation method of claim 1, wherein the node key is generated based on a Shamir's secret sharing algorithm.

6. The key generation method of claim 1, wherein the selecting operation:
    receives response messages in reply to a join message requesting joining to the network; and
    selects the existing nodes as many as the predefined reference number t from the nodes which transmit the response messages.

7. A partial key generation method, comprising:
    generating, in response to receiving a partial key request message, a partial key of a node which transmits the partial key request message;
    randomizing the generated partial key; and
    transmitting the randomized partial key to the node which transmits the partial key request message, wherein:
    the randomized partial keys are randomized by the existing nodes using shuffled random numbers,
    each shuffled random number, Rj, is generated based on the equation:

$$R_j = \sum_{k=1, k \neq j}^{t} \text{sign}(ID_j - ID_k)(r_j + r_k) \bmod q$$

$$\text{where} \begin{cases} \text{sign}(x) = 1 & \text{if } x > 0 \\ \text{sign}(x) = -1 & \text{if } x < 0, \end{cases}$$

and
ID denotes the identification of the node generating the partial key, $r_j$ denotes the random number of the node generating the partial key, $ID_k$ denotes the identification of the $k^{th}$ existing node, and $r_k$ denotes the random number of the $k^{th}$ existing node.

8. The partial key generation method of claim 7, wherein the generating operation comprises:
   receiving:
      an ID $ID_{n+1}$ of the node which transmits the partial key request message; and
      IDs $ID_k$ of nodes, excluding itself, selected by the node transmitting the partial key request message;
   calculating a Lagrangian coefficient of the node transmitting the partial key request message using the ID $ID_{n+1}$ of the node transmitting the partial key request message, the IDs $ID_k$ of the nodes, and its ID $ID_j$; and
   generating the partial key by multiplying the calculated Lagrangian coefficient by its node key $K_j$.

9. The partial key generation method of claim 8, wherein the randomizing operation comprises:
   generating a random number $r_j$;
   transmitting the generated random number $r_j$ to the nodes, excluding itself, selected by the node transmitting the partial key request message;
   receiving random numbers $r_k$ from the nodes;
   generating a shuffled random number $R_j$ using the IDs $ID_k$ of the nodes received in the generating operation, the random numbers $r_k$ received in the receiving operation, the random number $r_j$ generated in the transmitting operation, and the ID $ID_j$; and
   randomizing the partial key by summing the shuffled random number and the partial key.

10. The partial key generation method of claim 7, wherein the partial key is generated based on a Shamir's secret sharing algorithm.

11. A non-transitory computer-readable storage medium storing a program to control nodes associated with a network, comprising instructions to cause a computer to:
   control a new node to select existing nodes as many as a predefined reference number t from nodes which configure a network;
   control the new node to transmit a partial key request message to the selected existing nodes; and
   control the selected existing nodes to generate a node key based on randomized partial keys received in response to the partial key request, wherein:
   the randomized partial keys are randomized by the existing nodes using shuffled random numbers,
   each shuffled random number, Rj, is generated based on the equation:

$$R_j = \sum_{k=1, k \neq j}^{t} \text{sign}(ID_j - ID_k)(r_j + r_k) \bmod q$$

$$\text{where} \begin{cases} \text{sign}(x) = 1 & \text{if } x > 0 \\ \text{sign}(x) = -1 & \text{if } x < 0, \end{cases}$$

and $ID_j$ denotes the identification of the node generating the partial key, $r_j$ denotes the random number of the node generating the partial key, $ID_k$ denotes the identification of the $k^{th}$ existing node, and $r_k$ denotes the random number of the $k^{th}$ existing node.

12. The non-transitory computer readable storage medium of claim 11, wherein the controlling of the selected existing nodes to generate a node key comprises controlling the selected existing nodes to sum all of the randomized partial keys as many as the reference number.

13. The non-transitory computer readable storage medium of claim 11, further comprising controlling an existing node to verify whether the node key is correct.

14. The non-transitory computer readable storage medium of claim 13, wherein controlling of the existing node to verify whether the node key is correct comprises:
   controlling the existing node to determine that the node key is correct when a product of values acquired by raising t error-checking witnesses generated at the network initialization to the power of a new node ID is equal to a value acquired by raising a generator generated at initialization to the power of a node key of the new node; and
   controlling the existing node to determine that the node key is incorrect when the two values are not equal to each other.

15. The non-transitory computer readable storage medium of claim 11, wherein the controlling of the selected existing nodes to generate a node key comprises controlling the selected existing nodes to generate the node key based on a Shamir's secret sharing algorithm.

16. The non-transitory computer readable storage medium of claim 11, wherein the controlling of the new node to select existing nodes comprises controlling the new node to:
   receive response messages in reply to a join message requesting joining to the network; and
   select the existing nodes as many as the predefined reference number t from the nodes which transmit the response messages.

17. A non-transitory computer-readable storage medium storing a program to control nodes associated with a network, comprising instructions to cause a computer to:
   control existing nodes to generate, when receiving a partial key request message, a partial key of a node which transmits the partial key request message;
   control an existing node to randomize the generated partial key; and
   control the existing node to transmit the randomized partial key to the node which transmits the partial key request message, wherein:
   the randomized partial keys are randomized by the existing nodes using shuffled random numbers,
   each shuffled random number, Rj, is generated based on the equation:

$$R_j = \sum_{k=1, k \neq j}^{t} \text{sign}(ID_j - ID_k)(r_j + r_k) \bmod q$$

$$\text{where} \begin{cases} \text{sign}(x) = 1 & \text{if } x > 0 \\ \text{sign}(x) = -1 & \text{if } x < 0, \end{cases}$$

and $ID_j$ denotes the identification of the node generating the partial key, $r_j$ denotes the random number of the node generating the partial key, $ID_k$ denotes the identification of the $k^{th}$ existing node, and $r_k$ denotes the random number of the $k^{th}$ existing node.

18. The non-transitory computer readable storage medium of claim 17, wherein the controlling of the existing nodes to generate a partial key comprises:
   controlling the existing nodes to receiving:
      an ID $ID_{n+1}$ of the node which transmits the partial key request message; and IDs $ID_k$ of nodes, excluding itself, selected by the node transmitting the partial key request message; and controlling the existing nodes to:
calculate a Lagrangian coefficient of the node transmitting the partial key request message using the ID $ID_{n+1}$ of the node transmitting the partial key request message, the IDs $ID_k$ of the nodes, and its ID $ID_j$; and
generate the partial key by multiplying the calculated Lagrangian coefficient by its node key $K_j$.

19. The non-transitory computer readable storage medium of claim 18, wherein the controlling of the existing node to randomize the generated partial key comprises:
controlling the existing node to:
generate a random number $r_j$; and
transmit the generated random number $r_j$ to the nodes, excluding itself, selected by the node transmitting the partial key request message;
controlling the existing node to receive random numbers $r_k$ from the nodes;
controlling the existing node to generate a shuffled random number $R_j$ using the IDs $ID_k$ of the nodes received in the generating operation, the random numbers $r_k$ received in the receiving operation, the random number $r_j$ generated in the transmitting operation, and the ID $ID_j$; and
controlling the existing node to randomize the partial key by summing the shuffled random number and the partial key.

20. The non-transitory computer readable storage medium of claim 17, wherein the controlling of the existing nodes to generate a partial key comprises controlling the existing nodes to generate the partial key based on a Shamir's secret sharing algorithm.

21. The key generation method of claim 1, wherein the one existing node among the existing nodes, upon generating the partial key, generates a random number and transmits the generated random number to the existing nodes.

22. The partial key generation method of claim 7, wherein the one existing node among the existing nodes, upon generating the partial key, generates a random number and transmits the generated random number to the existing nodes.

23. The key generation method of claim 1, wherein the identification of each of the existing nodes comprises at least one of an e-mail address, a unique number of a mobile device, an internet protocol (IP) address, a media access control (MAC) address, and a public key certificate.

* * * * *